US008843490B2

(12) United States Patent
Gazen et al.

(10) Patent No.: US 8,843,490 B2
(45) Date of Patent: *Sep. 23, 2014

(54) METHOD AND SYSTEM FOR AUTOMATICALLY EXTRACTING DATA FROM WEB SITES

(75) Inventors: Bora C. Gazen, Huntington Beach, CA (US); Steven N. Minton, El Segundo, CA (US)

(73) Assignee: Connotate, Inc., New Brunswick, NJ (US)

( * ) Notice: Subject to any disclaimer, the term of this patent is extended or adjusted under 35 U.S.C. 154(b) by 336 days.

This patent is subject to a terminal disclaimer.

(21) Appl. No.: 13/191,369

(22) Filed: Jul. 26, 2011

(65) Prior Publication Data

US 2011/0282877 A1    Nov. 17, 2011

Related U.S. Application Data

(63) Continuation of application No. 12/014,532, filed on Jan. 15, 2008, now Pat. No. 8,117,203, which is a continuation of application No. PCT/US2006/027335, filed on Jul. 14, 2006.

(60) Provisional application No. 60/699,519, filed on Jul. 15, 2005.

(51) Int. Cl.
*G06F 17/30*     (2006.01)

(52) U.S. Cl.
CPC ...... *G06F 17/3071* (2013.01); *G06F 17/30861* (2013.01)
USPC .......................................... 707/737; 707/755

(58) Field of Classification Search
USPC .................................................. 707/737, 755
See application file for complete search history.

(56) References Cited

U.S. PATENT DOCUMENTS

| 5,963,965 | A | * | 10/1999 | Vogel | 715/236 |
|---|---|---|---|---|---|
| 6,714,941 | B1 | * | 3/2004 | Lerman et al. | 707/758 |
| 7,454,430 | B1 | * | 11/2008 | Komissarchik et al. | G06F 17/30 |
| 2002/0083067 | A1 | * | 6/2002 | Tamayo et al. | 707/100 |
| 2002/0143659 | A1 | * | 10/2002 | Keezer et al. | 705/27 |
| 2005/0038785 | A1 | * | 2/2005 | Agrawal et al. | 707/6 |
| 2006/0026157 | A1 | * | 2/2006 | Gupta et al. | 707/6 |
| 2006/0224589 | A1 | * | 10/2006 | Rowney et al. | 707/9 |
| 2006/0235658 | A1 | | 10/2006 | Nitta et al. | |
| 2006/0241869 | A1 | | 10/2006 | Schadt et al. | |
| 2006/0287847 | A1 | * | 12/2006 | Moore | 704/8 |
| 2007/0143235 | A1 | | 6/2007 | Kummamuru et al. | |

OTHER PUBLICATIONS

Knoblock et al., Accurately and Reliably Extracting Data from the Web: A Machine Learning Approach, IEEE (1999).

(Continued)

*Primary Examiner* — Son T Hoang
(74) *Attorney, Agent, or Firm* — John D. Lanza; Foley & Lardner LLP

(57) ABSTRACT

In accordance with an embodiment, data may be automatically extracted from semi-structured web sites. Unsupervised learning may be used to analyze web sites and discover their structure. One method utilizes a set of heterogeneous "experts," each expert being capable of identifying certain types of generic structure. Each expert represents its discoveries as "hints." Based on these hints, the system may cluster the pages and text segments and identify semi-structured data that can be extracted. To identify a good clustering, a probabilistic model of the hint-generation process may be used.

20 Claims, 7 Drawing Sheets

(56) References Cited

OTHER PUBLICATIONS

Barash et al., Context-Specific Bayesian Clustering for Gene Expression Data, ACM (2001).

Steve Minton and Bora C. Gazen, International Search Report from PCT application No. PCT/US2006/027335 (filed Jul. 14, 2066), "Method and System for Automatically Extracting Data from Web Sites", dated Aug. 3, 2007 (2 pages).

* cited by examiner

FIG. 4

```
PROCEDURE CLUSTER(PAGES)
    PAGECLUSTERS= ∅
    FOR EACH PAGE p IN PAGES
        FIND THE BEST PAGE-CLUSTER pc IN
PAGECLUSTERS FOR p
        IF CHANGE IN PROB(HINTS | CLUSTERING) <
THRESHOLD
            CREATE A NEW PAGE-CLUSTER AND ASSIGN IT
TO pc
            ADD pc TO PAGECLUSTERS
        ADD p TO pc
```

FIG. 5

```
PROCEDURE ADD(PAGE p, PAGE-CLUSTER pc)
    FOR EACH TOKEN t IN PAGE p
        FIND THE BEST TOKEN-CLUSTER tc IN
pc.TOKENCLUSTERS
        IF CHANGE IN PROB(HINTS | CLUSTERING) <
THRESHOLD
            CREATE A NEW TOKEN CLUSTER AND ASSIGN
IT TO tc
            ADD tc TO pc.TOKENCLUSTERS
        ADD t TO tc
```

US 8,843,490 B2

METHOD AND SYSTEM FOR AUTOMATICALLY EXTRACTING DATA FROM WEB SITES

CROSS-REFERENCE TO RELATED APPLICATIONS

The present application is a continuation of co-pending U.S. patent application Ser. No. 12/014,532 filed on Jan. 15, 2008 and entitled "Method and System for Automatically Extracting Data from Web Sites," which is a continuation of International Application No. PCT/US2006/027335 filed on Jul. 14, 2006, which claims the benefit of U.S. Provisional Application No. 60/699,519, filed Jul. 15, 2005, all of which are incorporated herein by reference in their entirety.

STATEMENT REGARDING FEDERALLY SPONSORED RESEARCH OR DEVELOPMENT

This invention was made with government support under Grant No. DMI-0441563 awarded by the National Science Foundation (NSF). The government has certain rights in the invention.

BACKGROUND OF THE INVENTION

1. Field of the Invention

The present invention relates generally to a network data extraction system, and in particular to a system for automatically extracting data from semi-structured web sites.

2. Discussion of Prior Art

Previous approaches to web data extraction primarily fall into two main categories. First, "wrapper induction" systems often use the approach of learning site-specific rules for extracting data using positional and content cues. These systems may be trained to recognize and extract data from specific page types on a web site. A second approach includes systems that crawl through a web site looking for particular types of content, such as job postings or seminar announcements. These systems are site-independent, but they must generally be trained to recognize the targeted content.

SUMMARY OF THE INVENTION

In accordance with an embodiment of the invention, data may be automatically extracted from semi-structured web sites. Unsupervised learning may be used to analyze web sites and discover their structure. A method of this invention utilizes a set of heterogeneous "experts," each expert being capable of identifying certain types of generic structure. Each expert represents its discoveries as "hints." Based on these hints, the system clusters the pages and text segments and identifies semi-structured data that can be extracted. To identify a good clustering, the probability of clusterings, given the set of hints, is evaluated.

BRIEF DESCRIPTION OF DRAWING

The above and other aspects, features, and advantages of the present invention will become more apparent upon consideration of the following description of preferred embodiments, taken in conjunction with the accompanying drawing figures, wherein:

FIG. 4 is an example of pseudocode for a leader-follower algorithm according to the invention;

FIG. 5 is an example of pseudocode for clustering tokens on a web page;

DETAILED DESCRIPTION OF THE PREFERRED EMBODIMENTS

Figure 1:
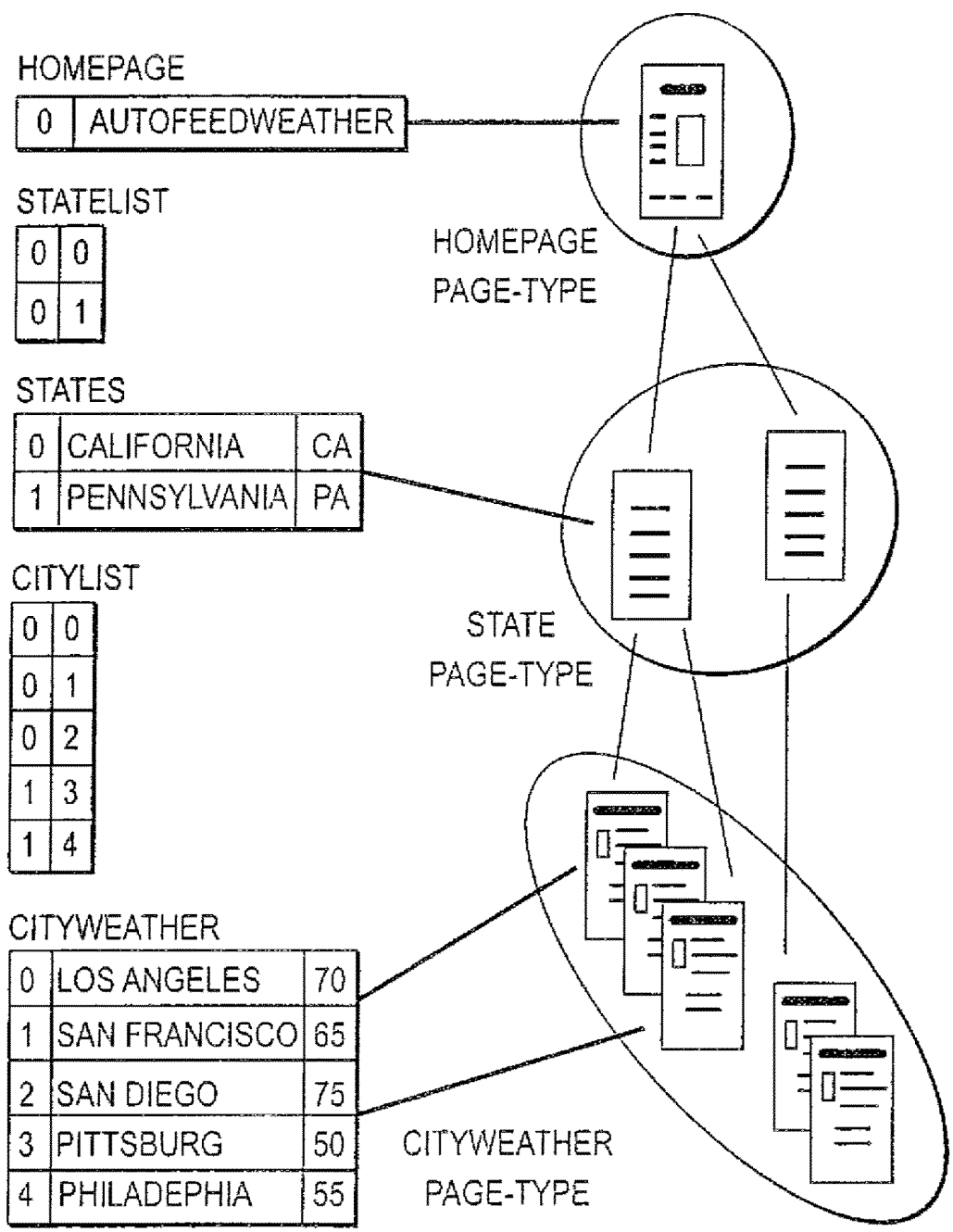
FIG. 1 is an example of a relational model of a web site in accordance with the invention.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

1. Introduction

In accordance with embodiments of the present invention, unsupervised learning may be used to analyze the structure of a web site and its associated pages. One objective is to extract and structure the data on the web site so that it can be transformed into relational form. For instance, for an e-commerce retail web site it is desirable to be able to automatically create a relational database of products. Other web sites of interest may include news web sites, classified ads, electronic journals, and the like.

The "wrapper induction" system may only be shown examples of a single page type, and moreover, a human marks up each example page. The "site extraction problem" is in some sense a natural problem since web sites are generally well-structured so that humans can easily understand and navigate through a web site. One possible approach for extracting data is to identify pages that share the same grammar, and then use the grammar to extract the data.

As demonstrated by V. Crescenzi et al. in "Roadrunner: Towards automatic data extraction from large web sites," Proceedings of 27th International Conference on Very Large Data Bases, pages 109-118 (2001), if a human selects a set of similar example pages, grammar induction techniques may be able to automatically learn grammar for those pages. Unfortunately, this is a chicken and egg problem; without knowing anything in advance about the data on the pages, it is difficult to automatically identify pages that have the same grammar.

As will be described in detail herein, embodiments of the invention exploit the situation in which many different types of structures exist within a web site. This includes the graph structure of the links of a web site, the URL naming scheme, the content on the pages, the HTML structures within page types, and the like. To take advantage of these structures, a set of "experts" have been developed to analyze the links and pages on a web site and to recognize different types of structure. Based on the structure that is identified, the system may be directed to cluster the pages and the data within pages, so that it can create a relational structure over the data. If desired, a human can then identify which columns in the resulting relational table should be extracted.

Clustering is a natural approach to unsupervised structure discovery. Existing approaches to clustering typically define a similarity or distance metric on the space of samples. The clustering problem is to find a partitioning of the samples such that a global function defined over this metric is maximized (or minimized). For example, if the samples lie in an n-dimensional space, the distance between samples might be defined as the Euclidean distance and the function to minimize could be chosen to be average distance between samples in a cluster for a given number of clusters. The partitioning that minimizes the criterion function would then represent the underlying structure, grouping together samples that lie close to each other within the n-dimensional space.

The problem with this approach is that it makes it difficult to encode multiple types of background knowledge as there is ultimately only one metric that defines the similarity among all samples. For example, it may be desired to be able to cluster samples that share some important attributes, while simultaneously clustering other samples that share different attributes. A uniform metric makes this difficult, because as it brings samples that are similar in structure closer together, it also pushes apart samples that do not share that same similarity.

A purpose of the invention is to be able to combine many different types of knowledge to solve the site-extraction problem. Web pages can be compared by analyzing their URLs, their text content, and their page layout, among other dimensions, and it is desired to make use of all of these types of data in the clustering process. In the AI community, software "experts" utilizing a variety of types of heuristic knowledge have been successfully combined to solve problems in domains ranging from crossword puzzles (N. M. Shazeer, et al., Solving crossword puzzles as probabilistic constraint satisfaction, AAAI/IAAI, pages 156-162 (1999)) to Bayesian network structure discovery (M. Richardson et al., Learning with knowledge from multiple experts, T. Fawcett and N. Mishra, editors, ICML, pages 624-631, (2003)). However, it is not necessarily simple to adapt these techniques to clustering.

Researchers have shown that clustering algorithms can benefit from background knowledge. Background knowledge, passed onto a constrained (K. Wagstaff et al., Clustering with instance-level constraints, ICML '00: Proceedings of the Seventeenth International Conference on Machine Learning, pages 1103-1110, San Francisco, Calif., (2000)) or adaptive (W. Cohen et al., Learning to match and cluster large high-dimensional data sets for data integration (2002)) clustering system in the form of constraints or training samples, has been used to reduce the size of the clustering search space (K. Wagstaff et al., Constrained k-means clustering with background knowledge, ICML '01: Proceedings of the Eighteenth International Conference on Machine Learning, pages 577-584, San Francisco, Calif., (2001), dynamically adapt the similarity metric to better fit a problem instance (D. Klein et al., From instance-level constraints to space-level constraints: Making the most of prior knowledge in data clustering, C. Sammut and A. G. Hoffmann, editors, ICML, pages 307-314 (2002)), and generate improved initial partitionings (S. Basu et al., A probabilistic framework for semi-supervised clustering. KDD04, pages 59-68, Seattle, Wash. (August 2004)) for algorithms that require a starting partitioning. However, previous research on these approaches has focused on applying single, homogeneous types of knowledge.

As in constrained clustering, it is desired to pass background knowledge to the solver and not from only one heuristic expert but from many heterogeneous heuristic experts. The challenge in combining heterogeneous experts is expressing different types of knowledge in a common language so that they can be combined effectively. For example, in the web domain, the URL structure might represent a hierarchical organization of pages whereas the page layout might reveal some flat clusters. Combining such different types of knowledge is challenging.

To address this problem, experts may be constructed so that they output their observations using a common representation. In this scheme, the experts produce "hints" indicating, for example, that two items should be in the same cluster. The clustering process may then implement a probabilistic model of the hint-generation process to rate alternative clusterings.

Described below are embodiments which address the unsupervised site extraction problem, and report on experiments of a particular implementation. For a variety of web sites, the system performs comparably to supervised learning systems for many data fields.

2. General Concerns

Consider the task of creating a web site for current weather conditions in U.S. cities. As an example, a start could be defining a relational database table with the current weather for all the cities, one row per city. Next, a script may be written to generate an HTML page for each row of the table. At this point, there is a set of pages that contain information from a single relational database table and which are similarly formatted. Such a set of pages will be called a "page type."

The weather site may involve other page types as well. For instance, to help users navigate to the city-weather pages, pages may be included for each state, with each state page containing links to the city-weather pages. This can be done by creating a new page type for states. To do so, a new table is created that holds state information, such as state name and abbreviation, one row per state, and also another table that relates the records in the state and city tables, that is, listing the cities in each state. Using these tables a script would generate the corresponding HTML page for each state. If it is also desired to display a list of neighboring states on each state page, another table would be added to the database and script modified accordingly. By way of non-limiting example, in this model of web sites, one base table is used as the underlying data source for each page type, and an additional table is used for each type of list on the site. FIG. 1 shows a hypothetical weather web site and the underlying relational data, from the homepage down to the city-weather pages.

Now, suppose the exact opposite task is presented: given a web site, recover the underlying relational data-base tables. That is the task faced here. Relational learning approaches seem to offer a possible methodology. However, some existing relational learning methods, such as the probabilistic relational model (PRM) technique, start with data that is already in relational format and attempt to find an underlying model that would generate the data. In accordance with the present invention, a set of relations are not needed to start. Instead, the inventors have found that it is possible in many situations to discover both the relational data and the model by analyzing the HTML pages.

3. Approach

Figure 2:
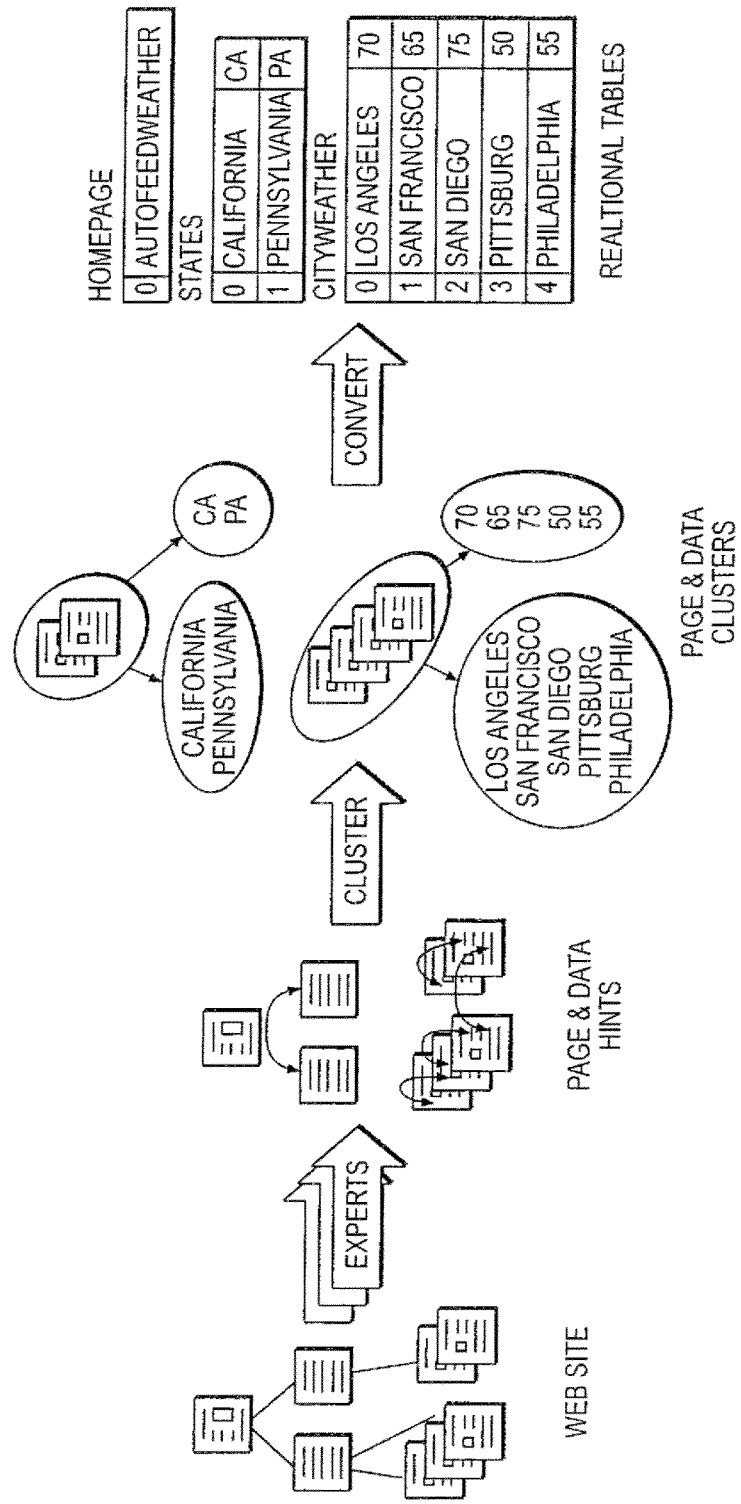
FIG. 2 shows an example of the manner in which the invention solves the site-extraction problem in accordance with this invention.

The site-extraction problem can be viewed as two clustering problems: the problem of clustering pages according to their page-type and the problem of clustering text segments so that segments from the same relational column are grouped together. A sub-goal of this approach is to discover the page and text-segment clusters. An example of this approach is shown in FIG. 2.

Consequently, the site-extraction problem is solved in three main steps: discovering low-level structure with heterogeneous experts; clustering pages and text segments to find a consistent global structure; and finding the relational form of the data from page and text-segment clusters. A preliminary step is spidering the web site from which the data is going to be extracted.

The starting input is the set of HTML pages on the site (including links on each page), which is obtained by spidering the site.

Each expert focuses on a particular type of structure and works independently from all the other experts. Thus, each expert does the following two tasks: analyze the pages and the links with respect to a particular type of structure and output hints to indicate the similarities and dissimilarities between items (that is, pages or text-segments). For example, examining the URL patterns on a web-site gives clues about groups of pages that may contain the same type of data.

The goal here is to define a generic clustering approach where clusters are determined by a joint decision of multiple experts. This is a more difficult problem than multi-expert classification. In the classification problem, each expert can vote on the label of the sample, and then the votes can be combined (for example, simply by counting) to determine the final label. The same approach does not quite work in the clustering problem: If each expert generates a clustering, then there is no obvious way to combine the decisions of the experts. For example, if one expert generates the clustering {{A, B, C}, {D}} and another one generates {{A, B} {C, D}}, one could argue that the final clustering should be {{A, B, C, D}} because A, B, and C are in the same cluster according to expert 1, and D is in the same cluster as C according to expert 2. But one could also argue that the final clustering should be {{A, B}, {C}, {D}} because C should not be in the same cluster as D according to expert 1 and C should not be in the same cluster as A and B according to expert 2. The goal is to define a framework in which clustering decisions of multiple experts can be expressed and combined.

The basic clustering framework itself already provides one mechanism in which expert knowledge is combined. If two samples, A and B, are considered in isolation, the experts (or features) may have no indication that they are similar (that is, in the same cluster). If the same elements are considered in the context of a clustering problem then the neighborhoods of A and B may give clues that in fact these samples are similar. This observation becomes even more important if, in fact, three different experts discover the neighborhood of A, the neighborhood of B, and the similarity of the two neighborhoods. In effect, disjoint experts have been combined to reach a conclusion that could not have been reached using the individual experts.

To combine the decisions of multiple experts, standard clustering algorithms are extended so that clusterings are evaluated probabilistically, given the hints from the experts. Two example probabilistic models are described in the following text.

Once the pages and tokens are clustered, the next step is to produce the corresponding tables (that is, the relational view of the data). For each page cluster there is a set of tables. Each column in each table is given by a token cluster.

One of the tables associated with a page-cluster is the "base table" for that page-cluster. Filling in the base table is straightforward. Clusters containing a single data item per page become columns of the base table. For instance, for the weather site, the column containing the "current weather" for each city would be placed in the base table for cities (that is, where there is a row for each city).

Clusters containing list items are placed in separate "list tables." In general, producing list tables requires that list boundaries be determined because there may be more than one list per page-type. For the example here, the data of interest is assumed to be in at most one list. With this assumption, there is only one list table to produce and the columns of this list table are given by the clusters that have not been used in filling the base table.

Figure 3:
FIG. 3 shows data extracted from an exemplary web page in relational form in accordance with the invention.

At this point, the relational structure underlying the web site has been recovered, but it is not known which columns are of interest to the user for publication in the ultimate webfeed. FIG. 3 shows the data extracted from an exemplary page in relational form. In this figure, only a few of the many columns of the extracted table are shown, but note how each field, such as product name or price, is placed in a separate column. Also note that the second column contains HTML code, which is unlikely to be of interest to the user. Currently, the system has no understanding of the type of data contained in each column. For the experiments described in the next section, a human was relied upon to pick out the columns of interest. Alternatively, automated content-targeting can be used, employing, for example, the technique presented by K. Lerman et al. in "Wrapper maintenance: A machine learning approach," JAIR, 18:149-181 (2003), to identify the target columns. Which of these is best depends on the application.

It is useful, at this point, to automatically produce a web agent that can directly find the target data necessary for a webfeed. This eliminates the need to completely spider the site on subsequent visits, as well as the need to re-apply the clustering method (until the site changes its format). Using a supervised wrapper induction system, one can build an efficient web agent that can directly navigate to the pages with the target data and extract the data. Examples of such wrapper induction system include the commercially available AgentBuilder system developed by Fetch Technologies, Inc., of El Segundo, Calif., or the system described by C. A. Knoblock et al. in "Accurately and reliably extracting data from the web: A machine learning approach," pages 275-28, Intelligent Exploration of the Web, Springer-Verlag, Berkeley, Calif. (2003), or by S. Minton et al. in "Trainability: Developing a responsive learning system," IIWeb, pages 27-32 (2003). Normally, a wrapper induction system like the AgentBuilder system requires users to manually mark up examples of target pages, which can be a time-consuming, laborious process. The data extracted by AutoFeed software (a trademark of Fetch Technologies, Inc.) provides an alternative to hand-labeling pages. From the AutoFeed software examples, the AgentBuilder system and other similar systems can be configured to automatically learn an agent that will navigate to the target pages and extract the target data.

4. Implementations

In this section two implementations of this approach are described. Each implementation follows the main steps described in the Approach section. First, the system collects pages by spidering a web site, then the experts find substructures and output their discoveries as hints. Next, the pages and the text segments are clustered.

The two implementations have different hint languages, different probabilistic models, and use different clustering algorithms. The first implementation focuses on clustering the pages and text segments at the same time. The second implementation improves on the hint language.

As stated before, the input is the set of HTML pages on the web site (including links on each page), which is obtained by spidering the web site, or using any other suitable data gathering technique. The pages may then be tokenized into individual components (that is, strings, URLs, numbers, etc.) based on the analysis performed by a set of "experts" which examine the pages for URLs, lists, template structures, and the like.

As the experts examine the HTML pages and report various types of structure, and the start/end character positions of the hypothesized structure are noted. The page is then tokenized so that these start and end positions are the token boundaries, minimizing the number of tokens generated. For example, if an expert generates a hypothesis (or "hint") that refers to a long URL, such as:

"http://news.yahoo.com/news?templ=story&ciid= 514& . . . "

and no other expert generates a hint that refers to the substrings of this URL, then there is no reason to break it apart into smaller parts.

To discover the relational data on a web site, an initial focus may be to find the individual columns of the tables. In accordance with an embodiment of the invention, a clustering approach is used during which attempt is made to arrange token sequences on the HTML pages into clusters, so that eventually each cluster contains the data in a column of one of the underlying tables. Once this is achieved, it is straightforward to identify the rows of the table, producing the complete tables from the clusters.

As HTML pages are processed (the tokens are clustered), it is also convenient to cluster the pages themselves in order to identify page types. Accordingly, the following representation may be used.

In general, a page-cluster may contain a set of pages, and is also the parent of a set of token-clusters. All of the tokens of the pages in a page-cluster may be clustered into the child token-clusters of that page-cluster. For example, suppose work is being done on the weather site which contains a home page listing all the states, state pages listing all the cities in that state, and weather condition pages that display the current conditions in a any particular city. When page-clusters are found for this web site, three clusters are expected to be found: one for weather-condition pages, one for the state pages, and one containing only the home page. The token-clusters for the weather-condition page-cluster might include a cluster for city names, another for low temperatures, and another for high temperatures.

One approach to discovering, generating, or otherwise finding page-clusters is to apply a distance metric based on surface-structure, such as viewing a page as a bag-of-words and measuring the similarity between the document vectors. This type of approach may not always correctly cluster web pages from a single web site because the true similarity of pages is typically discovered after some understanding is obtained of the deeper structure of the page. For example, determining that a web page with a short (or empty) list is similar to one with a long list may require that the first one discovered have a similar context surrounding the list, even though these pages may not appear similar in words, length, and so on.

Rather than using a metric based on surface-structure to directly measure similarity of pages, the system may implement multiple experts to generate "hints" that describe local structural similarities between pairs of pages (or between pairs of tokens). The hints may then be used to cluster the pages and tokens. Our approach utilizes a heterogeneous set of experts such that for any given web site, the discoveries of at least some of the experts will make the solution obvious, or at least nearly so. This is based on observations that individual experts are successful in finding relevant structure some of the time, but not all of the time.

The hints provide a common language for experts to express their discoveries. In general, two types of hints are used: page-level and token-level. A page-level hint may be defined as a pair of page references indicating that the referred pages should be in the same cluster. For example, if the input contains $page_1$ with URL "weather/current_cond/lax.html" and $page_2$ with URL "weather/current_cond/pit.html," a URL-pattern expert might generate ($page_1$, $page_2$) as a page-level hint. Similarly, a token-level hint is a pair of token sequences; the hint indicates the tokens of the two sequences should be in the same token-clusters. A list expert might generate ("New Jersey," "New Mexico") as a token-level hint, among many other similar hints, after examining a page which contains a list of states.

By way of example, possible experts include URL patterns, list structure, templates, and layout, among others. Each of these experts will now be described.

With regard to URL patterns, page-hints are generated for pairs of pages whose URLs are similar. This expert is helpful for identifying pages that should go into the same page-cluster. For example, on the weather site, if all the state pages had the constant "USstate" in their URL, it would be helpful. However, on some web sites the expert can be over-specific (for example, if the state page URLs had no commonality) or over-general (if state and city pages all had similar URLs).

Concerning list structure, within each page repeating patterns of the document object module (DOM) structure are searched for. Token-hints are generated for the nodes that match each pattern. This expert works well when the DOM structure is well-formed and reflects the structure of the underlying data. However, there are some pages where this assumption does not hold, such as when special characters are used to format lists, rather than HTML formatting tags.

The template expert may be used to search for or otherwise identify token sequences that are common across pages. Token-hints are generated for these sequences and the sequences in-between them. This expert is effective for identifying simple template structure shared by multiple pages. However, this expert may be misled when it is run on a set of pages that contain one or more pages that are not generated by the same grammar as other pages.

Concerning layout, DOM nodes that are aligned in vertical columns on the screen and generate token-hints for the token sequences represented by these nodes were found. This expert utilizes the visual representation of the page which reflects the structure of the data, but there are usually coincidental alignments that cause this expert to sometimes generate bad hints.

After the experts analyze the input pages, there are a great many hints, some of which may be conflicting, which complicates the clustering process. For this reason, a probabilistic approach is employed that provides a flexible framework for combining multiple hints in a principled way. In particular, a generative probabilistic model is employed that allows assignment of a probability to hints (both token hints and page hints) given a clustering. This in turn allows a search for clusterings that maximize the probability of observing the set of hints.

In accordance with an embodiment, we determine the probability of a token-hint ($s_0$, $s_1$) as follows, where $s_0$ and $s_1$ are sequences of tokens. For each pair of token ($t_0$, $t_1$) such that $t_0$ is in $s_0$, $t_1$ is in $s_1$, and both $t_0$ and $t_1$ are in the same token-cluster $c_t$, a probability is assigned by assuming that choosing any token-cluster is equally likely ($1/\text{count}_{tc}$ where $\text{count}_{tc}$ is the number of token-clusters) and also that picking any pair of tokens within $c_t$ is equally likely ($1/C(|c_t|,2)$ where $|c_t|$ is the number of tokens in $c_t$ and $C(n,r)$ denote combinations). For any remaining unmatched tokens in $s_0$ and $s_1$, probabilities of $1/\text{count}_t$ are assigned where $\text{count}_t$ is the total number of tokens within all the token-clusters. Finally, the assumption is made that these probabilities are independent and their product is assigned to ($s_0$, $s_1$) and normalized to account for the lengths of the two sequences.

To determine the probability of page hints, one may consider only page clusters. If a page hint ($p_0$, $p_1$) is satisfied by the clustering, that is, $p_0$ and $p_1$ are in the same page-cluster $c_p$, then it is assigned a probability by assuming that picking any page-cluster is equally likely ($1/\text{count}_{pc}$ where $\text{count}_{pc}$ is the number of page-clusters) and also that choosing any pair of pages from $c_p$ is equally likely ($1/C(|c_p|,2)$. Otherwise, it is assigned a small probability.

This probabilistic model allows permits assignment of a probability to hints given a clustering, which in turn permits a search for clusterings that maximize the probability of observing the set of hints. One embodiment implements a greedy clustering approach, a specific example of which is based on the leader-follower algorithm presented by R. O. Duda et al. in "Pattern Classification," Wiley-Interscience Publication (2000). FIG. 4 provides an example of pseudocode for such a leader-follower algorithm. Adding a page to a page cluster involves clustering the tokens of the page. This operation may be accomplished using, for example, the pseudocode depicted in FIG. 5.

One advantage of the probabilistic model is that it prevents the system from simply clustering all the pages together. If one were just trying to maximize the number of hints that are satisfied, then one big page-cluster with all the pages (and one big token-cluster with all the tokens) would certainly be optimal. The probabilistic model addresses this by assigning smaller probabilities to hints in larger clusters.

5. Experiments

Evaluating the system of this invention is challenging because of the size and scope of the problem faced. The output of existing web extraction systems is normally a small subset of the output produced by this system on any given site. For example, if this system is compared against a web-page wrapper, only a few of many clusters can be evaluated because the wrapper would normally extract only a few fields, whereas the present system would cluster all the tokens on the pages. Manually evaluating the system is also difficult because of the size of the output. So instead of evaluating the full output, the focus here is on evaluating how well the system does in extracting target data from different types of websites, such as product catalogs, electronic journals, and job-listings.

Specifically, the output of the AutoFeed software is compared to the output of web wrappers that have been created using the AgentBuilder system of Fetch Technologies (a supervised wrapper induction system) and manually validated for correctness. The output of a wrapper, when applied to a set of pages, can be represented as a table whose columns correspond to the fields extracted by the wrapper. These columns are referred to as "target columns" (or, equivalently, "target fields") and the extracted data values in each column are referred to as the "target data."

The evaluation proceeds as follows. For each target column produced by the wrapper, the AutoFeed column is found that contains the most target values. If there is a tie, the column with the fewest total values is chosen. Then the retrieved and relevant count RR (the number of target values in this AutoFeed column) is calculated. The total number of values in the AutoFeed column (Ret) and the total number of target values (Rel) are reported. Precision is defined as RR/Ret and recall as RR/Rel.

Experiments are reported in three domains.

Table 1 is a summary of AutoFeed results for e-commerce sites, journals, and job-listings.

TABLE 1

| Field | RR | Ret | Rel | Precision | Recall |
|---|---|---|---|---|---|
| manufacturer | 81 | 81 | 81 | 100% | 100% |
| item no. | 100 | 100 | 103 | 97% | 97% |
| model no. | 66 | 68 | 71 | 96% | 93% |
| name | 97 | 100 | 103 | 97% | 94% |
| price | 77 | 88 | 103 | 85% | 75% |
| authors | 1173 | 1197 | 1212 | 98% | 97% |
| title | 1173 | 1188 | 1212 | 99% | 97% |
| position | 1391 | 1391 | 1453 | 100% | 96% |
| req. id | 1278 | 1278 | 1422 | 100% | 90% |
| location | 1302 | 1302 | 1445 | 100% | 90% |

In the first experiment, AutoFeed results are compared to seven wrappers that return data from retail sites. These wrappers were originally built for Stanford Research Institute's CALO project, sponsored by DARPA. CALO used these web agents to extract data about products from a specific category of the web site's catalog. For example, the agent for buy.com extracts information about projectors for sale.

Optimally, it would be preferred to spider each site, and then run AutoFeed to get the same data. In practice, the size of these sites—hundreds of thousands of pages—made this a time consuming process. To scale the size of the problem down, the spider was directed down to the correct category to collect pages that are relevant to the extraction task. The site was also spidered randomly to collect additional pages that a full-spidering would visit. This provides a collection of pages that is relatively small, but contains a high ratio of pages on which the CALO wrappers will work.

The target fields for this experiment were product name, manufacturer, model number, item number (SKIT), and price, all of which are generic across product types. Table 2 provides data relating to the extraction from e-commerce sites.

TABLE 2

| Web Site | | | Extracted | | | | |
|---|---|---|---|---|---|---|---|
| Vendor | Pgs. | Products | Mfg (RR/Ret) | Name (RR/Ret) | Mod# (RR/Ret) | Mfg# (RR/Ret) | Price (RR/Ret) |
| buy | 24 | 12 | 12/12 | 9/12 | 10/12 | 12/12 | 0/12 |
| compusa | 26 | 16 | 16/16 | 16/16 | 16/16 | 16/16 | 15/16 |
| gateway | 22 | 9 | — | 6/9 | 6/9 | 6/9 | 6/9 |

TABLE 2-continued

| Web Site | | | Extracted | | | | |
|---|---|---|---|---|---|---|---|
| Vendor | Pgs. | Products | Mfg (RR/Ret) | Name (RR/Ret) | Mod# (RR/Ret) | Mfg# (RR/Ret) | Price (RR/Ret) |
| newegg | 24 | 10 | 10/10 | 10/10 | 10/10 | 10/10 | 0/10 |
| overstock | 26 | 13 | — | 13/13 | 13/13 | 13/13 | 13/13 |
| tigerdirect | 23 | 11 | 11/11 | 11/11 | 11/11 | 11/11 | 11/11 |
| photoalley | 44 | 32 | 32/32 | 32/32 | — | 32/32 | 32/32 |

Near-perfect results were realized on 4 of the 5 extraction fields of Table 2. On the price field, values were missed on only two of the web sites. In both of these sites, the AutoFeed software extracted the price as part of a larger field because of variations in the formatting of the price field. Note that the evaluation criteria is rather strict: AutoFeed gets no credit for the longer field values even though the values include the prices and they are in a cluster of their own. This in turn lowers the overall precision and recall scores in Table 1.

To test the AutoFeed performance on fully spidered sites, the second experiment selected four open access electronic journals which could be completely spidered: DMTCS, EJC, JAIR and JMLR. Wrappers were built for the author, title, and ArticleURL fields for either the "detail pages" (the pages with meta-data on the individual articles) or, in the case of EJC, for the table-of-contents pages (because it had no detail pages on the individual articles). AutoFeed was run on the full collection of pages and the electronic journals extraction results are depicted in Table 3.

TABLE 3

| Web Site | | | Extracted | | |
|---|---|---|---|---|---|
| Journal | Pages | Articles | Authors (RR/Ret) | Titles (RR/Ret) | URLs (RR/Ret) |
| DMTCS | 128 | 112 | 112/112 | 112/112 | 112/112 |
| EJC | 19 | 645 | 645/669 | 645/660 | 0/0 |
| JAIR | 347 | 297 | 259/259 | 259/259 | 259/259 |
| JMLR | 183 | 158 | 157/157 | 157/157 | 157/157 |

As shown in Table 3, the AutoFeed system correctly retrieved all the target values on DMTCS and missed only one article on JMLR. AutoFeed retrieved approximately 90% of the values for JAIR. The missed values were on pages that are clustered separately from the main cluster of detail pages. On the EJC site, there are no individual pages for articles, but all the information is still available from the table-of-contents pages (thus the large difference between the number of pages and the articles). AutoFeed returned all the target values for the author and title fields, but also included some spurious values. For the PDF/PS URL field (for downloading the articles) on the EC site, the results show 0 retrieved values because AutoFeed returned a longer field containing multiple links to different formats of the article.

For another experiment, 50 employers with online job listing from the Forbes list were chosen. On each of these sites, the system spidered from the main job-listings page down to the individual posting pages. Among the sites, the common fields were position, requisition-id, and location (Table 1) so it was decided to evaluate AutoFeed on those. Out of the 50 sites, 11 proved to be too difficult for the current version of AutoFeed. The set of experts used in the current version were not able to find the deep structures of these sites correctly. For the remaining 39 sites, the results are reported in Table 4.

TABLE 4

| Web Site | | | Extracted (RR/Ret) | | |
|---|---|---|---|---|---|
| Employer | Pgs | Jbs | Title | Id | Loc. |
| altera | 49 | 13 | 13/13 | 13/13 | 13/13 |
| amer. tower | 44 | 32 | 32/32 | 32/32 | 32/32 |
| amerus | 51 | 31 | 31/31 | 31/31 | 31/31 |
| assoc. bank | 39 | 16 | 16/16 | 0/16 | 16/16 |
| avalonbay | 29 | 25 | 25/25 | 25/25 | 25/25 |
| bankunited | 63 | 20 | 20/20 | 20/20 | 20/20 |
| bea | 114 | 93 | 47/93 | 47/93 | 47/93 |
| broadcom | 22 | 10 | 10/10 | 10/10 | 10/10 |
| carolinafirst | 253 | 84 | 84/84 | 84/84 | 84/84 |
| devonenergy | 91 | 53 | 52/53 | 52/53 | 52/53 |
| ea | 28 | 15 | 15/15 | 15/15 | 15/15 |
| eogresources | 42 | 20 | 20/20 | 20/20 | 20/20 |
| equitable | 28 | 8 | 8/8 | 8/8 | NA |
| fbr | 33 | 30 | 30/30 | 30/30 | 30/30 |
| flagstar | 159 | 141 | 136/141 | 136/141 | 136/141 |
| indymac | 106 | 101 | 100/101 | 100/101 | 100/101 |
| insight | 63 | 31 | 31/31 | NA | 31/31 |
| juniper | 49 | 21 | 19/21 | 19/21 | 19/21 |
| markel | 33 | 19 | 16/19 | 16/19 | 16/19 |
| medimmune | 147 | 115 | 115/115 | 115/115 | 115/115 |
| microchip | 47 | 37 | 37/37 | 37/37 | 37/37 |
| mylan | 36 | 26 | 26/26 | 26/26 | 26/26 |
| ncen | 133 | 132 | 132/132 | 132/132 | 132/132 |
| oge | 11 | 5 | 5/5 | 5/5 | 5/5 |
| patterson | 26 | 4 | 4/4 | 4/4 | 4/4 |
| pepco | 15 | 10 | 10/10 | 10/10 | 10/10 |
| phoenix | 23 | 15 | 15/15 | 15/15 | 15/15 |
| pixar | 32 | 27 | 23/27 | 23/27 | 23/27 |
| pnc | 45 | 20 | 20/20 | 20/20 | 20/20 |
| protective | 37 | 31 | 31/31 | 31/31 | 0/31 |
| qlogic | 61 | 59 | 59/59 | 59/59 | 59/59 |
| rga | 57 | 16 | 16/16 | 0/16 | 16/16 |
| simon | 66 | 49 | 49/49 | 49/49 | 49/49 |
| skyfi | 39 | 10 | 10/10 | 10/10 | 10/10 |
| tollbrothers | 53 | 50 | 50/50 | 50/50 | 50/50 |
| troweprice | 59 | 50 | 50/50 | 0/50 | NA |
| trz | 39 | 14 | 14/14 | 14/14 | 14/14 |
| whitney | 59 | 10 | 10/10 | 10/10 | 10/10 |
| wilm. trust | 14 | 10 | 10/10 | 10/10 | 10/10 |

Note that in the experiments, the report is mainly on fields of base tables, which have only one value per page, and not on fields of list tables, which may have any number of values on a single page. List fields are generally more difficult to extract and the results are often harder to evaluate. In addition to improving AutoFeed, work is continuing on a more comprehensive evaluation and establishing a repository of test cases.

6. Bayesian Network Based

In a first implementation, an expert expresses its discovery by adding to the collection of hints a binary hint that indicates that two samples (either pages or text segments) are in the same cluster. For a given pair, the absence of a hint can mean either that the expert cannot make a decision about the pair or that it discovered that the pair should be in separate clusters. This ambiguity is a shortcoming of the first implementation and prevents experts from indicating that items should not be in the same cluster.

This problem is addressed by extending the constraint language of constrained clustering. In constrained clustering, constraints are defined in the form of "must-link" or "cannot-link" pairs. A must-link pair indicates that the pair of samples must be in the same cluster, a cannot-link indicates the opposite.

The "must-link" and "cannot-link" paradigm works well when the constraints are coming from an authoritative source, such as a human user, but not so well when they are generated using heuristics that can make errors. To take into account constraints that may not always be accurate, the constraint language is extended so that constraints are assigned confidence scores. This allows an expert to output hints with varying levels of confidence. For example, if a particular type of structure indicates that two items may be similar but are not necessarily similar, the expert can express this by assigning a relatively lower level of confidence to the corresponding hint.

The clustering problem is represented as a Bayesian belief network. This approach is similar to the use of Bayesian networks in multi-sensor fusion (K. Toyama et al., Bayesian modality fusion: Probabilistic integration of multiple vision algorithms for head tracking, Proceedings of ACCV '00, Fourth Asian Conference on Computer Vision (2000), and Z. W. Kim et al., Expandable bayesian networks for 3d object description from multiple views and multiple mode inputs, IEEE Trans. Pattern Anal. Mach. Intell., 25(6):769-774 (2003)). In multi-sensor fusion, the problem is determining the unknown state of the world from noisy and incomplete data from many sensors. In clustering, the task is determining the unknown clustering from evidence collected by experts. The tasks are similar in that both sensors and experts give partial information about the hidden state. For example, a sensor might give a 2D image of a 3D scene and an expert can find clusters in only a subset of the samples.

In multi-sensor fusion, the Bayesian network is structured based on the assumption that for a given state of the world, the data from the sensors is independent. This leads to the following network structure: The variables representing the unknown state of the world are root nodes. The variables representing the observed states of the sensors are descendants of these variables.

In the clustering problem, the unknown clustering of the samples replaces the unknown state of the world. To simplify the process in which experts pass their clustering discoveries into the network, an additional layer of nodes is added to the network. This extra layer contains a node for every pair of samples in the problem. Each such "InSameCluster" node represents whether the pair of samples is in the same cluster or not. For a given clustering, the value of such a node is determined, and each node is conditionally independent of the others given the clustering node.

The experts in the clustering problem correspond to the sensors in the multi-sensor fusion problem, but sensors typically provide specific evidence whereas experts provide virtual evidence. The difference arises from the fact that experts reach the evidence through a process not modeled within the network. In practice, this means that while the output of a sensor can be represented as an observed value of a variable in the network (for example, color=red), the expert's output is only a probabilistic suggestion (for example, color=red with confidence 0.7). To represent such evidence, virtual evidence nodes (also called dummy nodes by Pearl (J. Pearl, Probabilistic Reasoning in Intelligent Systems: Networks of Plausible Inference. Morgan Kaufmann Publishers Inc., San Francisco, Calif., (1988)) are used without specifying the values they take. Each such "VirtualEvidence" node is a child of an InSameCluster node and each InSameCluster node has as many child VirtualEvidence nodes as there are experts. This network structure represents the notion that each expert will observe with some probability whether two samples are in the same cluster or not. The evidence can then be propagated from each virtual evidence node to its parent InSameCluster node. An example of this is shown in FIG. 6.

Figure 6:
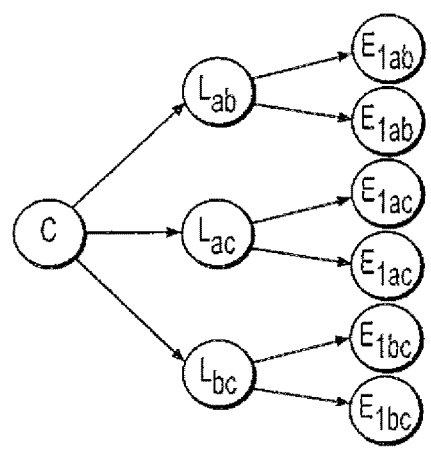
FIG. 6 is an example of how a Bayesian network would function according to the invention for purposes of clustering.

FIG. 6 shows the Bayesian network for clustering three samples a, b, and c, with evidence from two experts E1 and E2. The domain of the root node C contains the five partitionings: {abc}, {a, bc}, {b, ac}, {c, ab}, and {a, b, c}. The three nodes labeled $L_{ij}$ are the pairwise InSameCluster nodes. The leaf nodes of the network are the VirtualEvidence nodes.

There are three types of probability tables associated with this Bayesian network. Table 5 shows sample tables for the network in FIG. 6.

TABLE 5

| P(C) | |
| --- | --- |
| c | P(C = c) |
| abc | 0.2 |
| ab, c | 0.2 |
| ac, b | 0.2 |
| bc, a | 0.2 |
| a, b, c | 0.2 |

| $P(L_{ab}|C)$ | | |
| --- | --- | --- |
| c | $P(L_{ab} = True|C)$ | $P(L_{ab} = False|C)$ |
| abc | 1.0 | 0.0 |
| ab, c | 1.0 | 0.0 |
| ac, b | 0.0 | 1.0 |
| bc, a | 0.0 | 1,0 |
| a, b, c | 0.0 | 1.0 |

| $P(E_{1ab}|L_{ab})$ | |
| --- | --- |
| $l_{ab}$ | $P(E_{1ab} = Observed|L_{ab})$ |
| True | 0.7 |
| False | 0.3 |

The first is the probability table of the clustering node. For this node, all clusterings are assumed to be equally likely. The second is the conditional probability table of an InSameCluster node. The value of this node is fully determined given a particular clustering. This means $P(InSameCluster_{xy} = True|C=c_i)=1$ if samples x and y are in the same cluster in clustering $c_i$, and 0 otherwise. The third is the conditional probability tables of the VirtualEvidence nodes. A simple training approach is used to determine these conditional probability values.

The goal of training for the system is to find, for each expert, suitable values for the following probabilities:

$P(VirtualEvidence|InSameCluster_{xy}=True)$ $P(VirtualEvidence|InSameCluster_{xy}=False)$ These values represent the confidence an expert has on the hypothesis that two samples are in the same cluster. In general, it is desired that these probability values be dynamically computed. The expert should examine a pair of samples before assigning a confidence score to the hypothesis that the samples are in the same cluster. Rather than having each expert directly compute these confidence scores, the process is divided into two steps. First, the expert assigns a similarity value to a given pair. In the second step, the similarity value is mapped into a confidence score. For example, an expert that computes edit-distance can assign the edit-distance as a similarity value and then this number can be mapped into a confidence score. The goal of the training process is to learn the mapping used in the second step.

For the types of experts used here, a simple training approach is sufficient. If the expert's output is real-valued (for example, cosine similarity), its distribution is assumed to be normal and the normal distribution parameters are learned from training data. If the output is discrete, a multinomial distribution is learned. In general, any other distribution or learning technique can be used to model an expert.

The fact that the Bayesian network allows experts to assign confidence scores to evidence is especially useful for experts that naturally compute a similarity score between sample pairs. For example, an expert based on string edit-distance naturally computes a similarity score, and intuitively, this score should be related to the likelihood of the pair of samples being in the same cluster. The Bayesian network allows experts to easily pass the expert-specific similarity scores into the network as probability values.

Another benefit of this model is that an expert can indicate that a sample pair should not be clustered together as easily, as it can indicate that they should be clustered together. A confidence score of 0.5 in an InSameCluster node shows that the expert has no evidence about whether the pair should be clustered in the same cluster or in different clusters. Scores less than 0.5 indicate that items should be in separate clusters and more so as the score approaches 0. Similarly, scores greater than 0.5 indicate that items should be in the same cluster and more so as the score approaches 1.

In the standard use of a Bayesian network, some of the variables are assigned their observed values and the effects of these assignments are propagated through the network so that the conditional distribution of the remaining variables is discovered. In the multi-sensor fusion problem, values representing sensor input are assigned to the sensor variables and the changes in belief are propagated through the network to find the probability distribution of the variables representing the unknown state of the world. If a single state is the desired output, then the most likely assignment of values can be picked as the output.

In the clustering domain, the process is the same. Experts provide evidence to the network and the effects of the observed evidence is propagated so that ultimately the conditional distribution of the clustering variable is determined. If only one clustering needs to be chosen, then the most-likely one can be picked among all the clusterings as the solution.

The hierarchical structure of the Bayesian network for clustering leads to the propagation algorithm which follows. First, virtual evidence from the experts is collected. Next, for each pair of samples, the belief in the corresponding InSameCluster node is calculated by propagating belief from all the VirtualEvidence nodes. Finally, the belief in the root clustering node is computed by propagation from all the InSameCluster nodes.

In practice, the final step of propagation is computationally intractable, as it involves assigning a probability to all the values in the domain of the root clustering node. This domain includes all possible clusterings of the samples, so its size is exponential in the number of samples.

Even though it is not possible to calculate the probability of every possible clustering, the Bayesian network is still useful for finding the probability of a given clustering. In other words, the network can be used to assign a value to P(C=c|evidence). More specifically, P(C=c|evidence) is the product of all P(InSameCluster$_{xy}$=True|evidence) if x and y are clustered together in c and P(InSameCluster$_{xy}$=False|evidence) otherwise. These terms, in turn, are products of the confidence scores being propagated from the Virtual Evidence nodes.

The goal is to find the most likely value of the clustering variable after all the evidence has been propagated through the Bayesian network, but standard propagation algorithms are not adequate for this network. This is because propagation in a Bayesian network normally involves computing the probability distribution of a small number of variables, each of which has a small domain. In this case, even though interest is in the probability distribution of only one variable, the domain of this variable is exponentially large. The standard algorithms simply assign probabilities to all the values in this exponentially large domain resulting in an exponentially expensive computation.

The process of picking the most likely clustering can be viewed as a search problem. In this view, the standard propagation algorithms do complete searches through an exponentially large search space in which each search state represents a clustering. The algorithms visit the search states in arbitrary order and assign each a probability value. The state that represents the clustering with the highest probability is the goal state.

If the search space view of the problem is adopted, then other search techniques, especially those that don't traverse the complete search space, become alternatives to the standard propagation algorithms. For the work presented here, a greedy agglomerative clustering algorithm is used.

The idea of using a greedy agglomerative clustering search technique for finding a locally optimum clustering is not new. (A. Culotta et al., Joint deduplication of multiple record types in relational data, CIKM '05: Proceedings of the 14th ACM international conference on Information and knowledge management, pages 257-258, New York, N.Y., (2005)), follow a similar approach where they use a greedy agglomerative search algorithm after learning a distance metric on the sample space with CRFs.

The greedy agglomerative clustering works in the following way. The initial clustering consists of singleton clusters, one per sample. At each step, a pair of clusters is merged to create a larger cluster until there is only one cluster left. This pair is chosen by considering all pairs of clusters and evaluating the set of edges connecting one sample from one cluster to another sample in the other cluster. The score assigned to the pair of clusters is the product of the probabilities associated with these edges. The pair with the highest score is merged at each step and the process is repeated. As the greedy algorithm considers each clustering, it also calculates that clustering's probability by evaluating it within the Bayesian network. At the end of the merging process, the algorithm picks the clustering with the highest probability as the solution.

An interesting consequence of clustering with probabilistic edge-weights is that no external parameter is needed to determine the optimal clustering. This is in contrast to standard clustering approaches where one or more additional parameters, such as a distance threshold or the number of clusters, are required to fully determine the optimal clustering. The external parameters usually determine a point of trade-off between the two degenerate clusterings: one big cluster of all samples; and the set of singleton clusters. With probability weighted edges, no external parameter is necessary.

Another way to view the search is as a graph-partitioning problem. The nodes of the graph represent the samples and the weights $w_{xy}$ on the edges $e_{xy}$ represent the probability of the two ends of the edge being in the same cluster. Finding the most likely clustering is equivalent to finding a partitioning of the graph such that the product of score($e_{xy}$) is maximized where score($e_{xy}$) is $w_{xy}$ if nodes x and y are in the same partition and $1-w_{xy}$ if they are in separate partitions. This problem is similar to optimal graph-partitioning with weighted edges and in general intractable (N. Bansal et al., Correlation clustering. Machine Learning, 56(1-3):89-113 (2004)).

Figure 7:
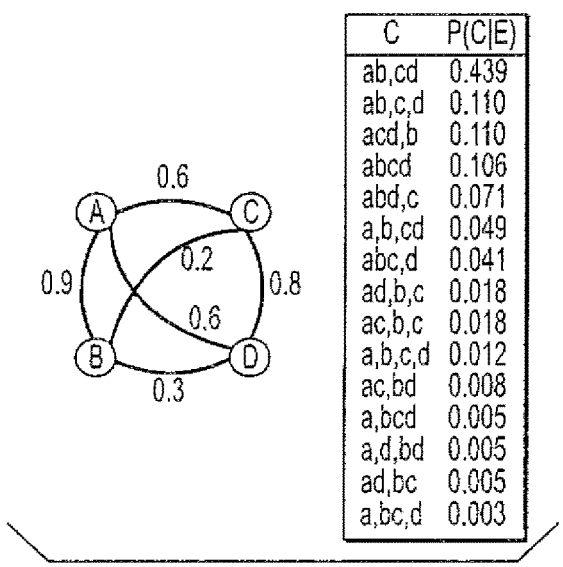
FIG. 7 shows a graph partitioning with a related table of probabilistic edge weights in accordance with the invention.

The table in FIG. 7 shows the normalized probabilities of all the partitionings of the graph for the edge weights shown. For example, the unnormalized probability for the partitioning {{ab}{cd}} is computed with $$w_{ab} \times w_{cd} \times (1-w_{ac}) \times (1-w_{ad}) \times (1-w_{bc}) \times (1-w_{bd}).$$

To cluster web pages from a web-site, searching multiple types of structure is useful, if not necessary. On a given web-site, any particular type of structure, such as URLs, links, page layout, HTML structure or content, may or may not contain useful information about the page-type. A successful approach has to be able to consider many types of structure as it clusters pages.

The basic approach here to page-clustering is to build experts for finding different types of structure. Each expert focuses on a particular structure and passes its discoveries as evidence into the Bayesian network. The clustering that has the highest probability, given the evidence, is then looked for.

A hypothetical example follows. Suppose the attempt is to cluster four pages, $p_1$, $p_2$, $p_3$, and $p_4$ from an on-line catalog using three experts, URL, page-layout, and content. Pages $p_1$ and $p_2$ list products from two different categories. Their URLs contain the category path (for example, Books/Nonfiction/Science/Computers). Pages $p_3$ and $p_4$ show detailed information about two products. Their URLs are identical except for the product id. The URL expert might determine that pages $p_3$ and $p_4$ are likely to be in the same cluster because their URLs are so similar, but might not be able to find any evidence about whether or not any other pair is in the same cluster. Similarly, the page-layout expert might determine that $p_1$ and $p_2$ are likely to be in the same cluster, because each contains many text segments that are indented exactly the same amount, but not find any evidence about the other pairs. With this much evidence, pages $p_1$ and $p_2$ can be clustered together and pages $p_3$ and $p_4$ can be clustered together, but determining if the cluster of $p_1$ and $p_2$ should be merged with the cluster of $p_3$ and $p_4$ still cannot be determined. The content expert, on the other hand, might find that neither $p_1$ and $p_2$ can be in the same cluster with $p_3$ and $p_4$ by computing a similarity metric such as cosine similarity between document vectors. If all the evidence is now combined, it can be determined with confidence that the best clustering is {{p1, p2}, {p3, p4}}.

7. Experts

In this implementation, we use the following experts: URL expert; template expert; page layout expert; table structure expert; and sibling pages expert.

The URL of a page is usually a good indicator of its page-type. Two pages that are of the same type will normally have similar URLs. The URL expert computes the similarity of the URLs of two pages based on the length of the longest common subsequence of characters.

Pages that contain the same type of data are usually generated by filling an HTML template with data values. The template expert determines the similarity of two pages by comparing the longest common sequence of tokens to the length of the pages. The longer the sequence, the more likely the pages are to be in the same cluster.

The page layout expert analyzes the visual appearance of vertical columns on the page. To do this, it builds a histogram of the counts of HTML elements that are positioned at each x coordinate on the screen. The similarity of these histograms is a good indicator that the pages are of the same page-type.

In general it is difficult to identify the similarity of two pages when one page contains a short list and the other a long list of items. The table-structure expert uses a heuristic to detect the similarity of such pages. The heuristic is based on the observation that some html structures (for example, <table>, <ul>, etc.) are commonly used to represent lists of items. This expert first finds these HTML structures, then removes all but the first few rows from each such structure and finally compares the remaining text of the two input pages. If the texts are similar, this is a good indicator that the pages are of the same-type.

The sibling pages expert relies on the observation that if a page contains a list of URLs, then the pages pointed to by these URLs, that is, the sibling pages, are likely to be of the same page-type. Thus, the expert first finds lists of URLs on individual pages and then generates hints indicating that the pages pointed to by these URLs are in the same page-cluster.

8. Experiments

For the web domain, a collection of pages from on-line retail stores is used. For the first implementation, sets of pages from these sites were collected by both directed and random spidering, so that the sets include a variety of page-types, but also a page-type that contains a number of pages that give detailed information about a product. The original dataset did not have page-type labels, so all the pages were manually labeled.

One site was held out at a time, the system on the remaining sites, and then it was evaluated on the held-out site. The pairwise-f1 measure was used to evaluate clustering accuracy. The following Table 6 contains the results for each of the sites as well the micro-averaged f1 score.

TABLE 6

| Site | Independent |
|---|---|
| Buy | 0.957 |
| Compusa | 0.997 |
| Gateway | 0.808 |
| Newegg | 0.585 |
| Overstock | 0.904 |
| Photoalley | 0.780 |
| Tigerdirect | 1.000 |
| Micro Average | 0.862 |

As the results show, this system works well on all but one of the sites. On examining the pages of Newegg, the site on which the system did not perform well, it was discovered that product pages on this site contain optional sections that appear only on some of the pages. This reduces the length of the shared sequence of tokens, thus reducing the confidence in the hypothesis that the pages are in the same cluster. The result is that the product pages are placed in multiple clusters such that each cluster contains pages with the same set of optional sections. This, of course, lowers the f1 score.

Clustering web-pages is an important step in unsupervised site-extraction and the results here can be directly used in that application, as described in previous work. (K. Lerman et al., Using the structure of web sites for automatic segmentation of tables, SIGMOD '04: Proceedings of the 2004 ACM SIGMOD international conference on Management of data, pages 119-130 (2004)). Unfortunately, the problem of site-extraction is a relatively new problem and direct comparison with other approaches is difficult. Other clustering work on web-pages focuses on clustering pages returned in response to queries. The main goal of these approaches is to make navigation easier for users by grouping related or similar pages together. Thus, such web-page clustering approaches are not comparable to the approach here, which clusters pages to a finer grain.

9. Text Segment Clustering

In this implementation, the text-segment clustering algorithm is applied after the page-clusters have been determined. So the overall approach is as follows: first, find the page clusters; next, for each page cluster, determine the set of text segments; then, cluster the text segments.

Other approaches to finding the text-segment clusters are certainly possible. For example, text segments from all pages (rather than from pages in a single page-cluster) can be clustered. This allows simultaneous clustering of pages and text-segments and opens up the possibility of co-clustering, where decisions made in one problem can be used to improve decisions in the other. Alternatively, text segments can be clustered while page segments are being clustered as in the first implementation. This allows one-way propagation of decisions from the text-segment clustering problem to the page clustering problem.

The first step in clustering text segments is to determine what the segments are. The problem of finding text segments within HTML pages is similar to the problem of finding word or sentence boundaries in natural language text. Such boundaries are best determined if the structure of the data is understood, but to understand the structure of the data requires that the boundaries be found first. So, this type of problem is another what-comes-first problem.

In this implementation, the boundary issue is bypassed by utilizing the surface-structure of the input. This is similar to assigning sentence boundaries to every period. This type of heuristic will miss some true sentence boundaries as in, "It works!," and generate some false positives as in "Mr. Smith left." On an HTML page, there are two obvious ways of implementing a similar heuristic. One is to find words by assigning boundaries to spaces, punctuation, among others. This tends to generate segments that are usually too short for the purposes here, in that data fields of interest are rarely single words. For example, data fields such as product names, street addresses, article titles, or dates all consist of more than one word. A second alternative is to use the HTML structure. The HTML structure already defines boundaries for segments of interest. These segments are text elements and links that appear as attributes of certain HTML tags. One minor problem with this heuristic is that text elements sometimes contain extra text in addition to the data of interest. For example, a text elements can contain "Price: $19.99" even though the only element of interest would be 19.99. In general, once the text-segment clusters are found, the extra text can be removed through a post-processing step. So, in this implementation, the HTML structure is used to determine the boundaries of text segments.

For text-segment clustering, the following types of experts are used: experts based on location of text-segment within a page; experts based on content; and experts based context.

The goal in clustering text-segments is to group segments not only according to their content, but also according to the relational column from which they might have originated. For example, multiple occurrences of the same segment (for example, the same date value) may sometimes come from different relational columns and segments that look very different (for example, book titles) may come from the same relational column. The following experts give clues that help with these types of decisions. They use the location within a page in which the segment is found as a clue to identify similarity.

Figure 8:
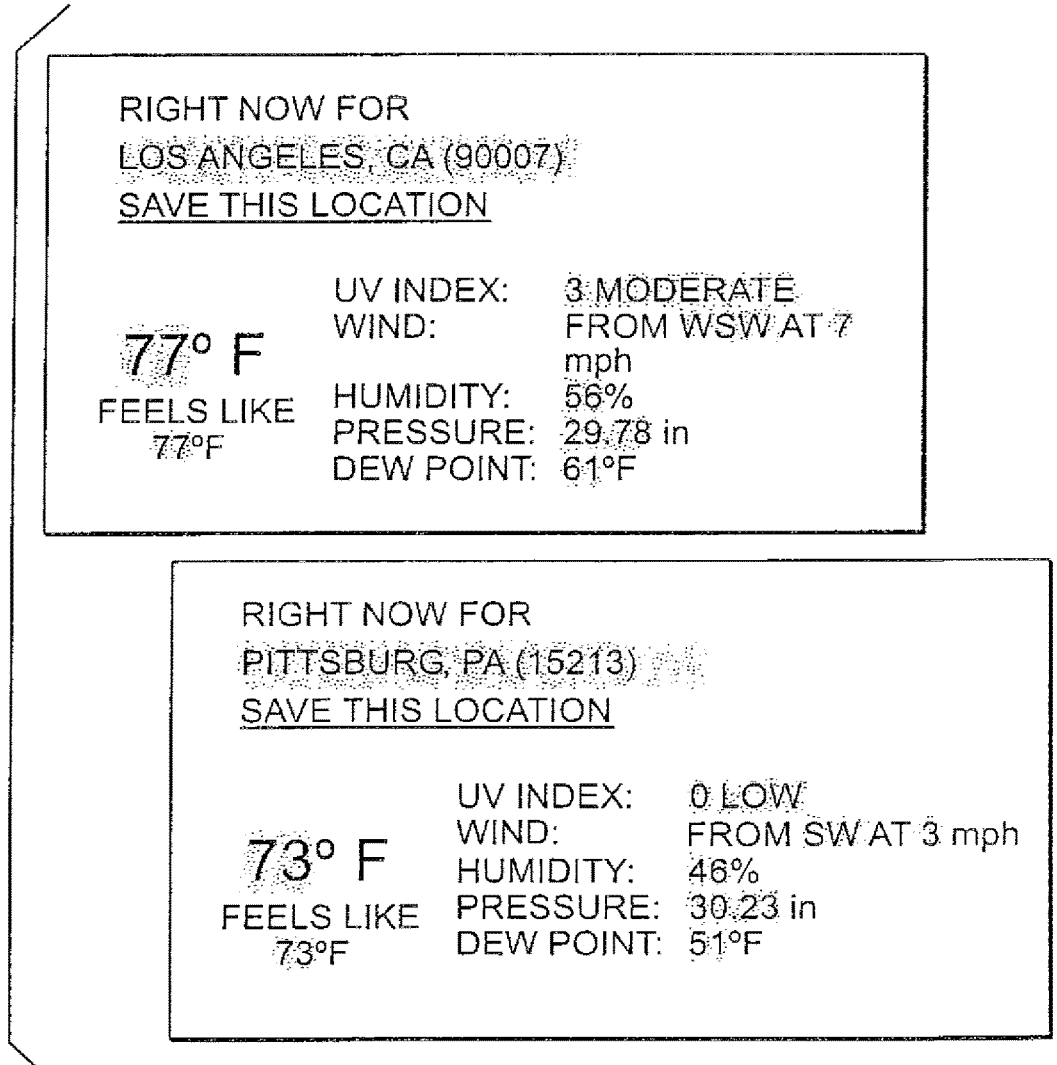
FIG. 8 shows examples of the use of templates to cluster text-segments in accordance with the invention.

Template slots experts, for example, find the common text between a pair of pages. The segments that are in the same slot (the text following the same segment of common text) on each page are likely to be in the same cluster. An example is shown in FIG. 8.

Figures 9, 10:
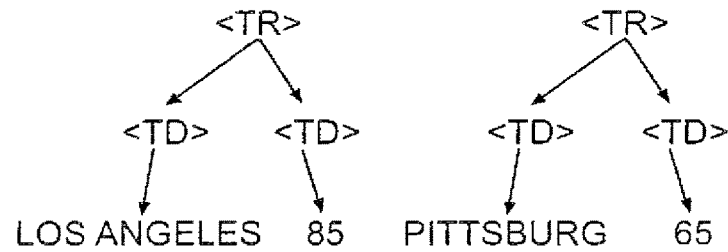
FIG. 9 shows the use of HTML patterns to cluster text segments according to the invention.
FIG. 10 shows the use of page layout to cluster text segments in accordance with the invention.

As another expert, list slots find repeating patterns of HTML structure within each page. Like templates, patterns have slots in which data fields appear. The segments that appear in the same slot are likely to be in the same cluster. A representation of a list slots expert is shown in FIG. 9.

Another expert within the location of text-segment within a page expert is the layout expert. This expert finds sets of text segments that have the same x-coordinate when the page is displayed on screen. The segments that are members of each such set are likely to be in the same cluster, and FIG. 10 represents an example of a layout expert.

Experts based on content look for similarities within the content of text-segments. For example, in a string similarity expert, the basic indicator that two segments are in the same cluster or not is how similar they are in terms of content. If the contents of two segments are similar, then they are likely to be in the same cluster.

In a data type similarity expert, segments that contain the same type of data are likely to be in the same cluster. For example, if two text segments consist of a street address each, then they are likely to be in the same cluster even if the addresses are not similar at all.

Then there are experts based on context. This type of expert uses the information contained in the text that immediately comes before or after the text segment it is analyzing. For example, if segments "1/1/1930" and "Unknown" both come after "Birth date," then they should be clustered together even though they have no similarity otherwise.

The main factor in the time complexity of the present approach is the search. The greedy search takes $O(n^3)$ time where n is the number of samples as there are n clusters to merge and each merge takes $n^2$ time to consider all pairs of clusters. The actual running time of this system varied between a few minutes to half an hour on the datasets described here.

10. Conclusions

Unsupervised site-extraction is a challenging task that is becoming more relevant as the amount of data available on the web continues to increase rapidly. The approach to the problem disclosed here includes, but is not limited to, combining multiple heterogeneous experts, each of which is capable of discovering a particular type of structure. Combining experts involves finding a global structure that is consistent with individual substructures found by the experts.

In the disclosure presented, a framework is investigated where clustering provides the global structure. The substructures found by experts are expressed as probabilistic constraints on the sample space. The global structure, clustering in this case, allows heterogeneous experts to be combined in such a way that the collection of experts can discover structures that no one single expert can.

What has been presented here demonstrates the broad potential of this approach. By using multiple experts, each capable of discovering a basic type of structure, it is possible to piece together clues which in turn lead to the relational data underlying the site. A particular power of this approach lies in combining multiple experts. Several experts are set forth as examples, but additional experts may be added to the system, and the various methods and techniques presented herein are equally effective for combining their discoveries.

The various search techniques may be modified so that they can handle significantly larger numbers of hints and web sites. For example, an incremental approach may be used during which the system iteratively spiders and clusters pages so that it can cut off search for pages of the same page type. This allows the AutoFeed system to handle much larger sites.

The various methods and processes described herein may be implemented in a computer-readable medium using, for example, computer software, hardware, or some combination thereof. For a hardware implementation, the embodiments described herein may be performed by a processor, which may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combinations thereof.

For a software implementation, the embodiments described herein may be implemented with separate software modules, such as procedures, functions, and the like, each of which perform one or more of the functions and operations described herein. The software codes can be implemented with a software application written in any suitable programming language and may be stored in memory, and executed by a processor. Computer memory may be implemented within the processor or external to the processor, in which case it can be communicatively coupled to the processor using known communication techniques.

While the invention has been described in detail with reference to disclosed embodiments, various modifications within the scope of the invention will be apparent to those of ordinary skill in this technological field. It is to be appreciated that features described with respect to one embodiment typically may be applied to other embodiments. Therefore, the invention properly is to be construed only with reference to the claims.

What is claimed is:

1. A method for automatically identifying semi-structured data from a semi-structured web site, the method comprising:
   analyzing links and pages on the semi-structured web site using a set of heterogeneous experts, each of the experts focusing on a respective type of structure included in the semi-structured web site;
   identifying, by the set of experts, similarities and dissimilarities between the analyzed links and pages;
   clustering pages and text segments based on the similarities and dissimilarities identified by at least two experts in the set of heterogeneous experts,
      wherein each of the at least two experts produces hints indicating whether two items should be together in a cluster, the hints containing respective levels of confidence; and
      wherein the clustering text segments comprises:
         finding page clusters;
         determining a set of text segments for each of the found pare clusters; and
         clustering text segments of the set of text segments;
   identifying, based on the clustering of pages and text segments, at least some of the semi-structured data to be extracted from the semi-structured web site;
   extracting the at least some of the identified semi-structured data; and
   transforming the extracted semi-structured data into a relational structured form.

2. The method of claim 1, further comprising evaluating a probability of a clustering based on the hints to determine a quality of the clustering.

3. The method of claim 1, wherein the clustering of pages and text segments provides at least two alternative clusterings.

4. The method of claim 3, further comprising employing probabilistic models to rate the alternative clusterings.

5. The method of claim 1, further comprising employing a generative probabilistic model to enable assignment of probabilities to the hints in view of a clustering.

6. The method of claim 5 wherein all hints are assigned the probabilities.

7. The method of claim 6, wherein probabilities of page hints are determined from page clusters.

8. The method of claim 1, further comprising adding to the hints a binary hint that indicates that a particular pair of items are in the same cluster.

9. The method of claim 8, further comprising extending a constraint language for constraint clustering, wherein constraints for the constraint clustering are defined in a form of must-link or cannot-link pairs.

10. The method of claim 9, further comprising extending the constraint language so that the constraints are assigned confidence scores.

11. A system for automatically identifying semi-structured data from a semi-structured web site by executing instructions stored in a computer-readable memory by a computer processor, the system comprising:
    means for analyzing links and pages on the semi-structured web site using a set of heterogeneous experts, each of the experts focusing on a respective type of structure included in the semi-structured web site;
    means for identifying, by the set of experts, similarities and dissimilarities between the analyzed links and pages;
    means for clustering pages and text segments based on the similarities and dissimilarities identified by at least two experts in the set of heterogeneous experts,
       wherein each of the at least two experts produces hints indicating whether two items should be together in a cluster, the hints containing respective levels of confidence; and
       wherein the clustering of text segments comprises:
          finding page clusters;
          determining a set of text segments for each of the found pare clusters; and
          clustering text segments of the set of text segments;
    means for identifying, based on the clustering of pages and text segments, at least some of the semi-structured data to be extracted from the semi-structured web site;
    means for extracting the at least some of the identified semi-structured data; and
    means for transforming the extracted semi-structured data into a relational structured form.

12. The system of claim 11, further comprising means for evaluating a probability of a clustering based on the hints to determine a quality of the clustering.

13. The system of claim 11, wherein the clustering means provides at least two alternative clusterings.

14. The system of claim 13 further comprises means for employing probabilistic models to rate the alternative clusterings.

15. The system of claim 11, further comprising means for employing a generative probabilistic model to enable assignment of probabilities to the hints in view of a clustering.

16. The system of claim 15, wherein all hints are assigned the probabilities.

17. The system of claim 16, wherein probabilities of page hints are determined from page clusters.

18. The system of claim 11, further comprising means for adding to the hints a binary hint that indicates that a particular pair of items are in the same cluster.

19. The system of claim 18, further comprising means for extending a constraint language for constraint clustering, wherein constraints for the constraint clustering are defined in a form of must-link or cannot-link pairs.

20. The system of claim 19 further comprising means for extending the constraint language so that the constraints are assigned confidence scores.

* * * * *